Nov. 1, 1938.   A. MOON   2,134,924
METHOD OF ACHIEVING ABSOLUTE STERILIZATION
Filed Nov. 1, 1933   3 Sheets-Sheet 1
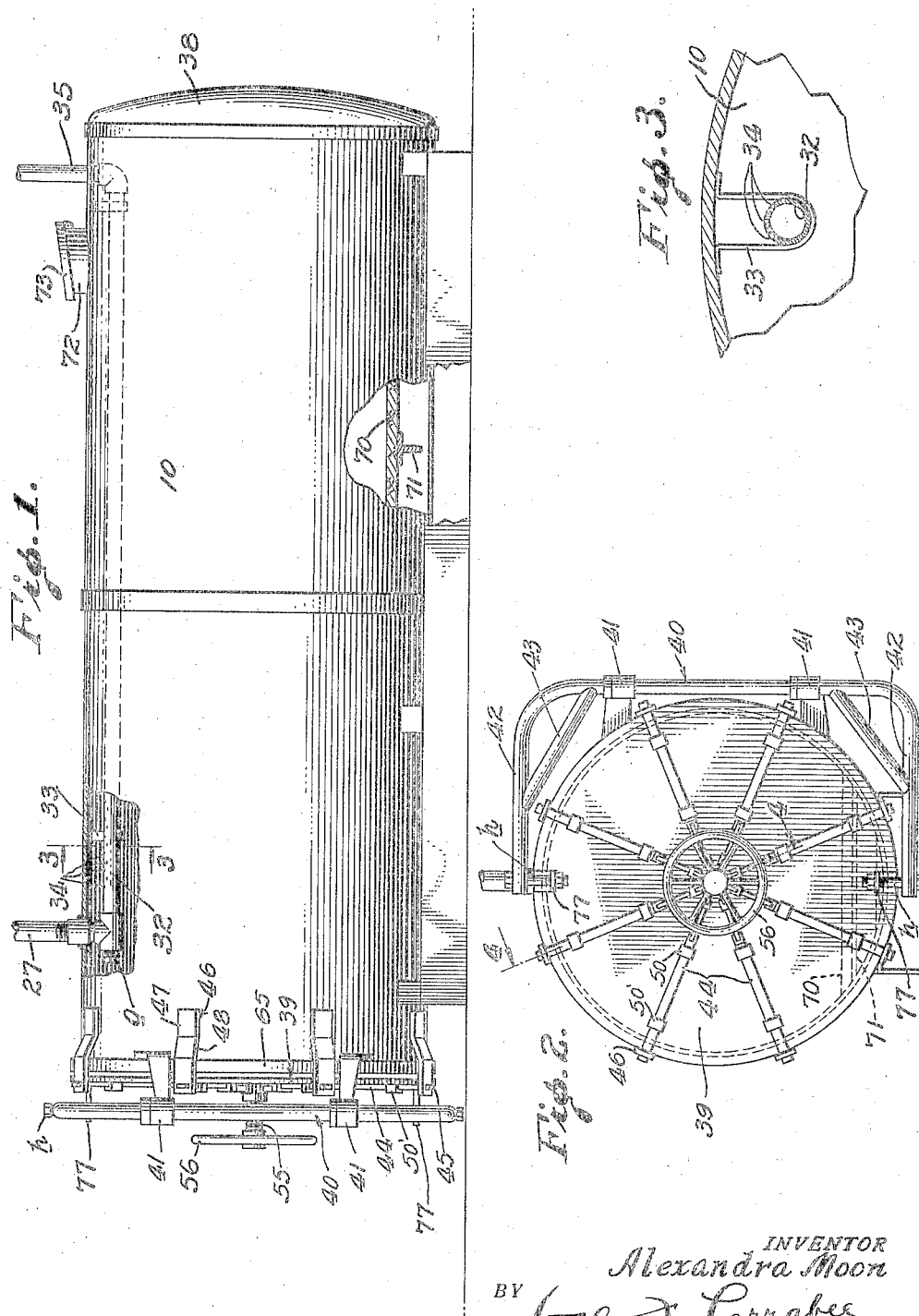
INVENTOR
Alexandra Moon
BY
Larrabee
ATTORNEY.

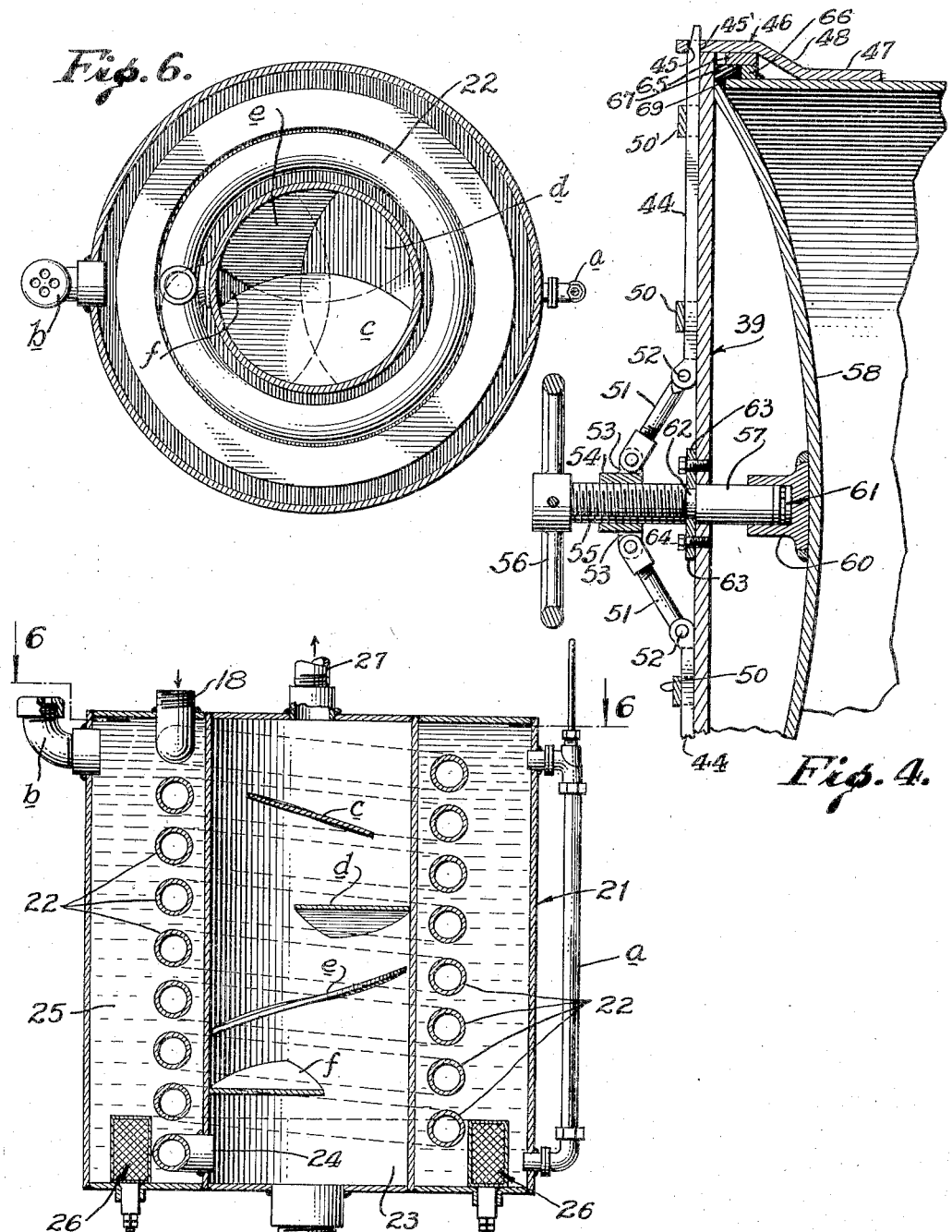

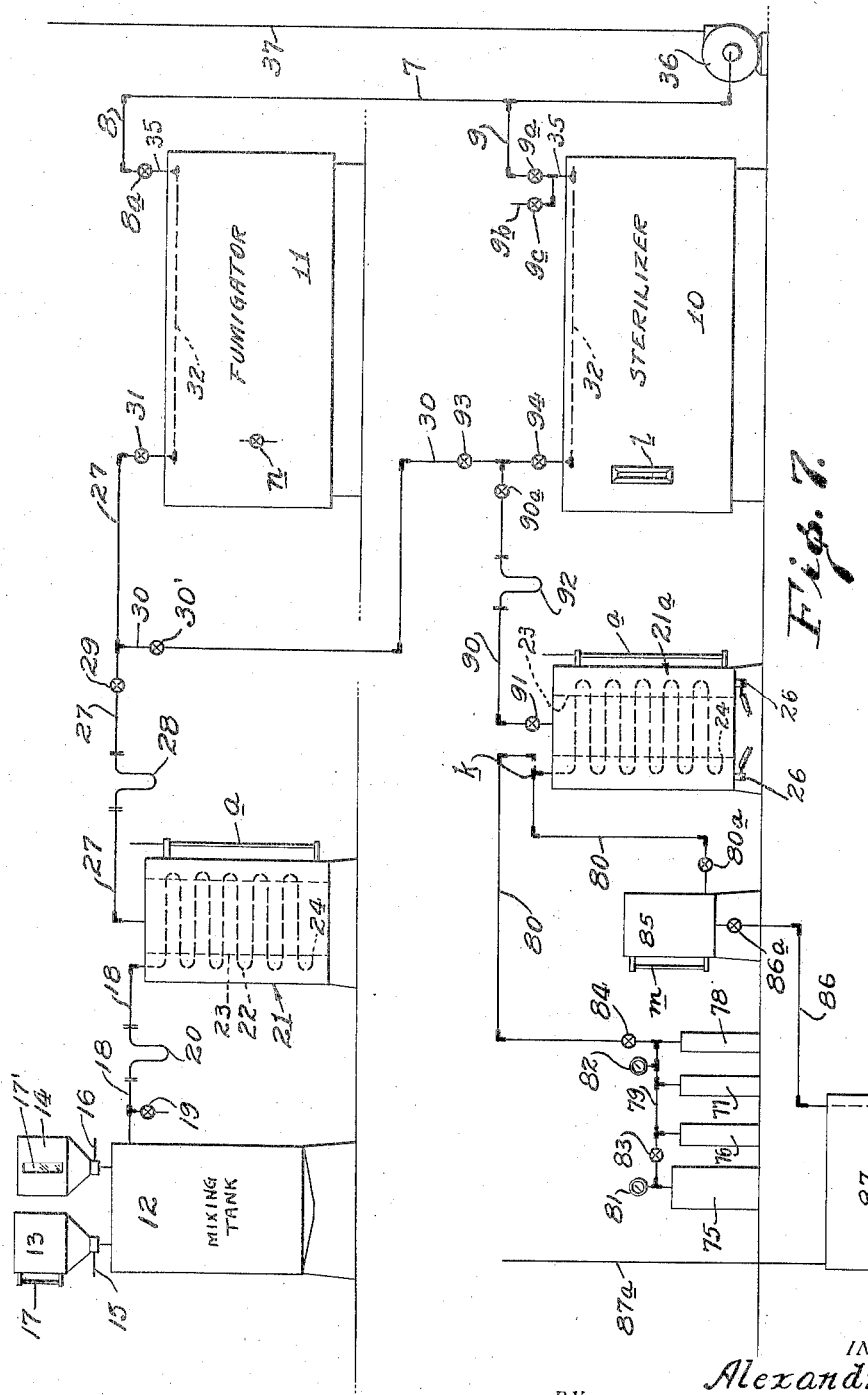

Patented Nov. 1, 1938

2,134,924

UNITED STATES PATENT OFFICE 2,134,924

METHOD OF ACHIEVING ABSOLUTE STERILIZATION

Alexandra Moon, Los Angeles, Calif., assignor to Margaret Crosse, Los Angeles, Calif.

Application November 1, 1933, Serial No. 696,121

5 Claims. (Cl. 21—58)

This invention relates to a method of and means for sterilizing materials, and/or perishable products whereby every kind of material or perishable product which is subject to infection or spoilage may be fumigated and sterilized without heating, without hydrocyanic acid gas, and without harm to delicate fabrics or products.

An object of this invention is the preservation of perishable products, such as perishable food products, by subjecting such products to a vacuum treatment and special gas formulae so as to preserve the same for a long period of time by suspending or greatly retarding agents causing spoilage. Perishable food products such as fruits, vegetables, fresh or dried living plants or nursery stock, grains, seeds, bulbs, oils, flour, flowers and every product which will survive vacuum, may be retained in their original state for many weeks and months or years without cooking the same or using other preservatives than my fumigating and sterilizing treatment.

Another object of this invention is to subject materials and other products to a chemical treatment in vacuum and which treatment will not injure the material or product being acted upon, and will completely sterilize or kill infectious germs.

Another object is to provide in the apparatus for carrying out my novel process, novel and improved means for efficiently evacuating air from the treating chamber to a vacuum of 29½ mercury inches and for diffusing the treating gases into such chamber, and for thoroughly converting the chemicals into a gaseous form before introducing the same into the treating chamber.

Among other objects of the invention are the provisions of improved means for sealing the treating chamber in an air tight manner; improved means to measure accurately the amount of the chemical charge which it is desired to use for treating each lot of material contained within the treating chamber; the provision of improved means for mixing together two or more different chemicals when it is desired to combine these to form a chemical gas; to provide a treating chamber which will be furnished with improved means for completely filling it in a convenient manner with material to be treated, and to provide improved means for exhausting the air from the treating chamber to a predetermined vacuum and thereupon effusing into said chamber the chemical gases to be used in treating its contents.

Another object of this invention is to provide novel and simple means whereby all kinds of bacteria, insects, worms, larvae, or other life which destroy food or fabrics, as well as the eggs of all pests, may be efficiently sterilized or killed; thereby preventing hatching and reinfestation; and whereby rotting, spoilage, mold, infection or propagation of pests may be effectively prevented or destroyed, without requiring high temperatures or the use of destructive disinfectant methods; and whereby the products may be treated as herein stated without loss of moisture or removal of the contents of bales, boxes, or packages, or any container in which such products may be contained, excepting only products contained in air tight or sealed containers.

Other objects, advantages and features of invention may appear from the accompanying drawings, the subjoined detailed description and the appended claims.

The accompanying drawings illustrate my novel apparatus for sterilizing materials and products in a form I at present deem preferable.

Figure 1 is a side elevation of an article or product treating chamber. Portions are broken away to disclose interior construction and to contract the view.

Fig. 2 is an end elevation of the treating chamber as viewed from the left looking toward the right of Fig. 1.

Fig. 3 is an enlarged detail sectional view taken on line 3—3, Fig. 1.

Fig. 4 is an enlarged sectional view of the chamber and closure member and sealing means as viewed on line 4—4, Fig. 2.

Fig. 5 is an axial longitudinal sectional view of the chemical converting apparatus.

Fig. 6 is a transverse sectional view of the chemical converting apparatus taken on line 6—6, Fig. 5.

Fig. 7 is a more or less diagrammatic view of the apparatus used in my novel process, showing diagrammatically the relative devices and their relative connections to each other.

My invention comprises a treating chamber 10, which, as shown in Fig. 7, are preferably two in number, one being used preferably as a sterilizer 10 for treating articles with certain kinds of gases and the other being used for the treatment of articles with other kinds of gases, which is indicated by the character 11.

A mixing tank 12 has connected thereto a plurality of containers 13 and 14, which are preferably located above the tank 12 and are respectively controlled by shut-off valves 15, 16, which may be of any suitable design or of the slide type as shown. The containers 13, 14 may be filled with any suitable chemicals or liquid or crystals and which chemicals are to be used in my process and which are to be mixed together before entering the converting chamber 21.

Each container 13, 14 is preferably provided with a capacity indicating gauge 17, 17', and tank 12 is connected to the converting chamber 21 through a conduit 18, which is provided with a trap 20 preferably made of transparent material such as glass so that any liquids trapped therein may be easily viewed by the operator.

A valve 19 controls the admission of atmospheric air to the conduit 18 so that air may be admitted to the conduit 18 and mixed with the chemicals introduced into mixing tank 12.

The converting chamber 21 shown in enlarged detail in Figs. 5 and 6, is provided with a central stack or generating chamber 23 and an annular heating chamber 25 surrounds the generating chamber 23. The conduit 18 is extended through the heating chamber 25 in the form of a coil 22 and discharges as at 24 into the lower end of generating chamber 23.

The heating chamber is preferably filled with water to a predetermined height and a water glass $a$ is provided to indicate the water level in heating chamber 25. A plurality of electrical or other heating elements or means 26 are provided to heat the liquid in heating chamber 25 and a capped inlet $b$ is provided at the top of heating chamber 25 to provide means to replenish the liquid therein as required.

Referring to Fig. 5 it will be seen that the generating chamber 23 is provided with a plurality of curved baffle plates, fins or partitions $c$, $d$, $e$, and $f$. The baffle plates are fragments of curved disk like members which are secured to the periphery of the generating chamber 23 in a helical or spiral manner extending from the bottom of chamber 23 toward the top thereof and the outer periphery of the baffle plates overlap one another as shown in Fig. 6 so that a straight passage through chamber 23 is prevented and the chemical agent or agents introduced into chamber 23 from outlet 24 of coil 22 and inlet into chamber 23 will be generated, converted and intermingled one with the other into a gas in absolute concentration before such gas leaves chamber 23 through the outlet 27 of chamber 23. The generating chamber 23 is provided at its lower portion with a clean-out plug $g$ so that any solids or foreign particles may be removed therefrom.

The baffles $c$, $d$, $e$, and $f$, by the foregoing arrangement in chamber 23 will produce an upward swirling draught for the gases as they pass through chamber 23, and at the same time act as heated fins against which the gases contact in their passage through chamber 23 so as to remove all fluid from the chemical agent introduced into chamber 23 and thereby prevent condensation of the gases in the treating chamber.

From the foregoing it will be seen that any liquid, dry or gas chemical agent delivered into coil 22 from conduit 18 will pass downwardly through the previously heated coil and at the same time be subjected to the high temperatures created by the heating elements in heating chamber 25 so that when the chemical agent or agents are delivered into the generating chamber 23 they will be converted into a gas in absolute concentration in vacuum and upon such gas or gases passing through chamber 23 will be thoroughly intermingled one with the other, if more than one chemical agent is used and will be drawn from chamber 23 by the vacuum or suction means hereinafter described.

The conduit 27 is extended to be connected to either treating chamber 10, 11, and is provided with a glass trap 28 and a cut-off valve 29. The conduit 27 may be furnished with a branch 30 which leads to the sterilizer chamber 10 under control of valve 30', and conduit 27 may continue to the fumigator chamber 11 under control of a shut-off valve 31. As shown in Fig. 1 the conduit 27 is connected to an atomizer 32 that is mounted within and which extends substantially from one end to the other of the treating chamber and is supported therein adjacent to the upper side of the chamber by the stirrup or U-shaped members or hangers 33. The upper portion of atomizer 32 is provided throughout its entire length and on its upper periphery with a plurality of spray openings, or delivery openings 34 through which the vaporized chemicals are effused into the tank in a fine spray and in a diffused manner. The atomizer 32 after extending throughout the upper portion of the treating chamber is continued outwardly by a pipe section 35 which is connected to a rotary vacuum pump 36 and from said vacuum pump a discharge and delivery pipe 37 is extended to the atmosphere outside the building (not shown) in which the apparatus is installed and which pipe 37 is used to convey the used gases from the treating chamber to the atmosphere and to convey atmospheric air into the treating chamber to clear the gases from products or materials under treatment.

The treating chambers 10, 11, are shown as of a cylindrical character and are strongly constructed and finished at one end with a permanent closure 38 and at the other end with a strong, especially constructed door 39, or may have a door 39 at each end. It will be understood that the treating chambers 10, 11 are made sufficiently large to contain a considerable quantity of material to be sterilized. In the carrying out of the process the creation of a high vacuum in the chamber will, of necessity, subject the steel shells of the chambers to a high atmospheric pressure, and therefore, it is necessary that they be strongly built to sustain such pressure. The door 39 of the treating chamber is necessarily quite large and it therefore is provided with substantial supporting means which, as shown, consists of a swinging crane 40 that is mounted upon and journaled in a pair of bracket arms or hangers 41 which are welded or otherwise secured to the body forming the treating chamber 10. The crane 40 is furnished at each end with a laterally extending arm 42, said arms being reinforced by braces 43. The door 39 is of a circular character and the diametrically opposite sides are pivotally connected with the free ends of the arms 42 in order that said door may be swung to and from open position by the crane 40 and may at the same time be pivotally adjusted with relation to said crane, by means of the bolts $h$ that extend through arms 42 and engage angle plates 77 that are welded to and extend from door 39.

In order to clamp the door 39 firmly upon the body member forming the treating chamber and to make sure of an air tight fit a gasket 67 and clamping means is provided therefor, the door is furnished with a spider like arrangement of thrust bars 44 which are furnished with tapered extremities 45 (Fig. 4). These tapered extremities cooperate with the latch openings 45' in the catch arms 46 which are welded or otherwise secured to the exterior of the chamber 10. Each catch arm 46 is furnished with a shank portion 47 whereby it is secured to the body forming the chamber and has an outwardly directed central portion 48 thus causing the end portion of the arm to be off-set away from and beyond the periphery of the body member forming the treating chamber 10.

The thrust bars 44 are mounted to slide under keepers 50 and 50' carried by and secured to the door 39. In order to force said thrust bars 44 into their operative position, a plurality of thrust and knuckle motion levers 51 are provided and each of these levers is respectively pivotally connected at 52 with the inner end of its associated thrust bar 44 and at its other end is pivotally connected with an associated lug 53 formed upon a central collar 54. Within the collar 54 is a shaft which has a screw threaded connection with said collar. Said shaft 55 is provided with a hand wheel 56 by which it may be operated. The inner end portion of said shaft projects through the door 39 within which it is provided with a foot portion 57. Said door 39 is provided with a saucer shaped brace plate 58 to the center portion of the concave side of which is secured a socket member 60 within which the foot portion 57 of the shaft 55 has a working fit. A ball thrust bearing 61 is preferably provided upon the socket member 60 and the foot portion 57 of the shaft. Upon its foot portion and outside of but adjacent to door 39 the shaft 55 is provided with an annular groove 62, and a two-part collar 63 is fitted into said groove, and is secured to the door 39 by means of screws 64. Said collar 63 forms an outer bearing for the shaft 55 and with groove 62 prevents endwise movement of shaft 55.

The construction which has just been described affords a very efficient and substantial means for securing the door 39 in its closed position and for mounting the door for ease of opening and closing the same. Means will next be described whereby an air tight fit is secured between the peripheral portion of the door and the adjacent end of the body member that forms the treating chamber.

Owing to the fact that the extremities of the catch arms 46 are off-set laterally away from the chamber a space is provided between each of these arms and the end of the chamber. Within this space is fitted a ring or band 65 which fits snugly within the arms 46 just above their outwardly deflected portions 48. To the inner side of ring 65 is welded a narrow ring 66 which in turn is welded to the exterior of the body forming the sterilizing member 10 and 11. The ring 66 is of less width than the ring 65 and is arranged in such a manner with relation to the ring 65 that when the parts are assembled as shown in the upper portion of Fig. 4 an annular groove is provided around the end of the body member. Within this groove is seated a circular ring or gasket 67 of a compressible character such as rubber, and this gasket is of sufficient thickness to completely fill the groove and of sufficient width to project some distance beyond the end of the body member that forms chamber 10 or 11. When the door 39 is clamped to the body member forming the treating chamber the action of the tapered end portions 45 of bars 44 being forced into openings 45' will forcibly compress the gasket 67 in order to make an air tight fit of the door relative to the chamber. The gasket 67 may be supplemented by means of an internal ring 69 also of compressible material, the latter ring being of a sufficient thickness to press firmly upon the peripheral portion of the saucer shaped plate 58 when the door is clamped into closed position.

The sterilizer chamber 10, 11 is provided with a substantial floor 70 supported by angle iron members 71. This floor extends from end to end of the chamber and serves as a track over which the material to be treated may be conveyed and supported when the chamber is being loaded for use.

The top of the casing of the treatment chamber 11 is provided with a collar 72 having a cover 73 which serves as a safety device or explosion door.

A series of containers 75, 76, 77 and 78 for a chemical agent such as carbon dioxide are provided to be connected to the treating chambers 10, 11 and are each provided with a branch pipe which connects with a delivery pipe 79 and the delivery pipe in turn connects with a main pipe 80. Suitable pressure gauges 81 and 82 are provided and the flow of the chemical agent is controlled by the shut-off valves 83 and 84. The pipe leads to a T-pipe connection $k$ and thence to a converting chamber 21a the structure of which is substantially the same as that of the converting chamber 21 already described. A measuring tank 85 is provided with a supply pipe 86 which is controlled by shut-off valve 86a. Said supply pipe 86 communicates with a supply tank 87 which occupies an underground position to fit it for containing a desired explosive gas or chemical agent such as carbon-disulphide which may be used in my process. The tank 87 is preferably provided with a pipe 87a that leads to a gauge (not shown) at an elevated point, which indicates the quantity of the chemical agent in the tank 87.

A delivery pipe 90 controlled by shut-off valve 91 leads from the generating chamber in converting chamber 21a and has a glass trap 92 analogous to trap 28. The pipe 90 communicates with the pipe 30 already referred to, the latter pipe leading into the sterilizer chamber 10. At one side of the point where the pipe 90 communicates with the pipe 30 there is provided a shut-off valve 93, and at the other side thereof is provided a shut-off valve 94.

The vacuum pump 36 is shown provided with a main suction pipe 7 which is provided with a branch 8 that communicates with the fumigating chamber 11 through pipe 35 and with a branch 9 that communicates with the sterilizing chamber 10. Suction through the branch pipe 8 is controlled by means of the shut-off valve 8a and suction through the branch 9 and through pipe 35 is controlled by the shut-off valve 9a. Between the valve 9a and the sterilizing chamber 10, the branch pipe 9 is furnished with a second branch pipe 9b which in turn is controlled by a shut-off valve 9c.

I have illustrated two treatment chambers 10 and 11 for the reason that in an installation for the treatment of foodstuffs and also other articles and materials, the types of gases which may be indicated or required for the treatment of articles and materials other than foodstuffs, might be of such character as to be injurious or poisonous if employed in the sterilization of food products, and for this reason I prefer to employ a separate sterilization chamber 10 in which products other than foodstuffs may be sterilized and a separate sterilization chamber 11 with separate pipe connections, convertor and other apparatus connected thereto for the treatment of food products.

By using the two separate and distinct chambers one for the treatment of food products and one for the treatment of other articles, I may employ any desired types of gases which may be indicated as necessary for the complete sterilization of the various articles, and I avoid the possible contamination of the food products by residue of injurious or harmful gases which might be left clinging to the walls of the chamber or to the pipes leading thereto if a single treatment chamber were to be employed for the treatment of all such products. However, it will be understood that the construction and operation of both of the treatment chambers 10 and 11 is identical and hence a description directed to one is equally applicable to the other.

When the device is to be used for the sterilization of articles other than foodstuffs as shown in the drawings, the shut-off valves 8a and 93 will be closed to isolate the treatment chamber 11 and parts associated therewith from the remainder of the apparatus.

The converting chamber 21a will of course be and have been started into operation by causing heat to be conveyed from the heating elements 26 to the liquid in heating chamber 25 so that such liquid will have a sufficient temperature to fully convert into a gas the chemical agent to be used, and it has been found that temperatures between approximately 115 to 180 degrees Fahrenheit may be required. This will heat the coil 22 and the side walls of generating chamber 23 as well as the baffle plates c, d, e, and f, that extend from the side walls of chamber 23.

When this has been done the valve 9c being closed the vacuum pump 36 will be put into operation to create a vacuum of approximately 29½ mercury inches within the treating chamber of the sterilizer 10, and such vacuum may be determined by a vacuum gauge l which may be of either a column or spirit type. Then the shut-off valve 9a will be closed and the valves 90a and 91 and 80a will be opened the valves 86a and 94 being temporarily maintained in closed position. Then upon opening valve 94 the result will be that the vacuum created in the treating chamber 10 will cause a suction to be applied to the interior of the generating chamber 23 and thence through pipe 80 to the measuring tank 85 so as to create a partial vacuum within the measuring tank 85 and then valve 94 will be closed. It is to be understood that the sterilizing chamber 10 is considerably larger than the combined size of chamber 23 and tank 85 and therefore the creation of a partial vacuum in the chamber 23 and tank 85 in the manner stated does not materially reduce the degree of vacuum in the sterilizing chamber 10.

If it is desired to introduce in the chamber 10 a chemical agent supplied from the reservoir 87, and a chemical agent supplied from the storage tank 76, then the valve 84 on pipe 80 will be opened and the valve 83 is left closed, this condition being maintained at the same time that the partial vacuum is created in the measuring tank 85. The result of such an operation will be to create a partial vacuum in the containers 76, 77 and 78 which will, considered together, constitute a measuring chamber to be supplied with the chemical agent in the storage tank 75. When such partial vacuum has been created in containers 76, 77, and 78, valves 84 and 94 will be closed.

Upon closing valve 80a and then opening valve 86a the chemical agent such as carbon disulphide, ethylene or any desired explosive gas will be drawn from storage tank 87 into measuring tank 85 and the amount of such chemical agent thus supplied to tank 85 may be viewed by the level or gauge m and when the predetermined amount of such chemical agent is supplied to tank 85 valve 86a will be closed, and then valves 80a, 91, 90a and 94 will be opened to draw such gas through the generating chamber 23 and into the treating chamber. The valve 94 should be opened gradually so that the chemical agent will pass through chamber 23 at a slow speed so that it will be fully converted into gaseous form before its introduction into the treating chamber. Then valve 94 is again closed.

If a chemical agent such as carbon dioxide is desired to be introduced into the treating chamber from the storage tank 75 after a vacuum is created in tanks 76, 77 and 78, as hereinbefore described, the valve 84 will be closed and the valve 83 opened until a sufficient quantity of such chemical agent has been transferred from tank 75 to the tanks 76, 77 and 78 and such predetermined amount of carbon dioxide may be indicated upon the gauge 82 whereupon valve 83 will be closed, preferably when the reading is approximately 150 pounds.

To then introduce the chemical from tank 75 into the sterilizing chamber 10, the valve 84 will be opened and the chemical will then be permitted to flow into the generating chamber 23 and upon opening valve 91, 90a, and 94, chemical will be admitted into the sterilizing chamber 10 through the atomizer openings 34 in pipe 32.

After the chemical agents from tanks 75 and 87 have been withdrawn from their source of supply, through the generating chamber 23 where they are generated into a gas in absolute concentration, into the sterilizing chamber 10 the valve 90a will be closed so as not to apply a high degree of vacuum in the generating chamber 23, measuring tank 85, and tanks 76, 77 and 78.

However, if both carbon dioxide and carbon disulphide or analogous chemicals are to be admitted into the treating chamber, the carbon dioxide is admitted first and blankets the inside walls of the treating chamber as a cold, blanketing gas which when the heavier carbon disulphide is thereafter introduced will tend to retain its own character for some time before intermingling with the carbon disulphide, and therefore serves to blanket the explosive chemical gas, such as the carbon disulphide so that it will not expand or explode within the treating chamber. The cool carbon dioxide gas introduced into the treating chamber also serves to precool the articles in the treating chamber that are to be subjected to any process.

The gases thus admitted into the sterilizing chamber while the same is in a state of vacuum will thoroughly penetrate the articles to be treated for the desired result. Since the volume of the gas which is admitted to the chamber can be only such volume as has been measured into the converter 23 and tank 85 (and such volume is relatively small as compared to the volume of treatment chamber 10), the reduction in vacuum in the treatment chamber by the admission of the gas is relatively small, so that all of the cells of the material under treatment will remain open ready to breathe in the lethal gases as they are admitted to the chamber. Also, during the treatment interval all of the valves remain closed so as to hold the vacuum of 29½ mercury inches (reduced only by the volume of the gas which has been admitted) during the entire treatment interval assuring against any change or alteration in the concentration of the treatment gases or their dilution with air during this interval.

The gases after remaining in chamber 10 for a predetermined time, depending on the articles to be treated and the chemical agent being used, may be withdrawn from the sterilizing chamber 10 by opening valve 9a and operating the vacuum pump 36 after which fresh air is admitted to the sterilizing chamber by opening valve 9c and the chamber may again be evacuated by operation of vacuum pump 36 and fresh air again admitted by opening valve 9c. This air washing of the articles being treated may be continued as many times as desired, and by withdrawing the gases from the sterilizing chamber through the vacuum pump the gases are released to the atmosphere in very small quantities where they are dissipated.

It is believed the operation of admitting to the fumigator chamber 11, a chemical agent or agents such as from the mixing tank 12 and which are converted into a gas by their admixture in the mixing tank 12 and passage through generating chamber will be apparent from the foregoing and in this respect it will be apparent that such gas from tank 12 may be admitted to the sterilizing chamber 10 by closing valve 31 and opening valves 29, 30' and 93. An air inlet n is provided to admit fresh air into the fumigating chamber 11 after the articles therein have been subjected to the desired gas or combinations of gases, and to dispell or break the vacuum within the chamber so that the door may be opened.

It may be desired after the introduction of the carbon disulphide gas to the treating chamber to admit a subsequent charge of carbon dioxide or other gas and in that event the foregoing operations pertinent thereto may be repeated.

It will be apparent from the foregoing that various chemical agents or combinations thereof may be introduced into the treating chamber although it has been found that it is seldom necessary to use more than four chemical gases. Furthermore the gases admitted to the treating chamber are in absolute concentration and are not diluted by air before being sent into the vacuum or treating chamber, because they may be converted into a chemical gas from crystals in concentrated form by mixing the same in mixing tank 12.

The infectious organisms, their eggs, larvae, molds, spores bacteria, bacilli, etc., having been previously robbed of all oxygen by the creation of the vacuum in the treating chamber after the articles to be treated have been placed therein, will suck in the chemical gases and die from the lethal penetration; while eggs of insects or worms explode upon being subjected to my process.

By the admission and withdrawal of oxygen to and from the treating chamber after the articles have been subjected to the action of the chemical gases, all odor or residue of gases which have penetrated the materials will be fully withdrawn. Thereafter the door 39 may be opened and the articles withdrawn with full assurance that they have been freed from infection of all kinds.

By mounting the door 39 on the bolts h any side or upright adjustment thereof may be secured to insure proper positioning of the door 39 against gasket 67 when the door is moved to closed position.

A clean-out plug o is provided in one end of the pipe forming the atomizer 32 so that if necessary the atomizer may be cleaned.

From the foregoing it will be seen that my method of fumigating or sterilizing materials or products is carried on while such materials or products are maintained in a vacuum which is of a low temperature and which precools perishable products and eliminates all use of heat in the treating chamber.

The closure device herein disclosed is claimed in my divisional application, Serial No. 181,811, filed December 27, 1937. The gas generator herein disclosed is claimed in my divisional application, Serial No. 181,812, filed December 27, 1937.

I claim:

1. The method of achieving absolute sterilization of various materials which consists in subjecting said materials to a primary vacuum of not less than 29½ mercury inches to open the cell structure of the material and to extract oxygen therefrom, then exposing said material to a dry lethal gas without materially reducing said primary vacuum and without re-pumping; then holding said reduced primary vacuum in a static condition for a predetermined interval of time; and then alternately subjecting said material to a high degree of vacuum and to atmospheric oxygen to remove the lethal gas from the cell structure.

2. The method of achieving absolute sterilization of various materials which consists in subjecting said materials to a primary vacuum of not less than 29½ mercury inches to open the cell structure of the material and to extract oxygen therefrom; generating a lethal gas into said material without materially reducing said primary vacuum and without exposing said gas to air; then holding said reduced primary vacuum in a static condition for a predetermined interval of time and then alternately subjecting said material to a high degree of vacuum and atmospheric oxygen to remove said lethal gas from the cell structure.

3. The method of achieving absolute sterilization of various materials which consists in placing said materials in a treating chamber; then drawing a vacuum in said chamber of 29½ mercury inches to open the cell structure of the material and to extract oxygen therefrom; generating a dry lethal gas in absolute concentration; then admitting a volume of said gas into said chamber insufficient to reduce materially the vacuum therein; closing off said chamber to maintain the vacuum so reduced static during a predetermined treatment interval to thereby hold the cell structure of the material open and permit the penetration thereinto of said gas; and then alternately subjecting said material to a relatively high vacuum and to atmospheric oxygen to remove said gas.

4. The method of achieving absolute sterilization of various materials which consists in placing said materials in a treating chamber; then drawing a vacuum in said chamber of 29½ mercury inches to open the cell structure of the material and to extract oxygen therefrom, then admitting into said chamber a volume of carbon dioxide gas insufficient to reduce materially said vacuum, then admitting a volume of highly concentrated dry lethal gas to said chamber insufficient to reduce materially said vacuum: then closing off said chamber to maintain said vacuum so reduced therein for a predetermined length of time and then alternately subjecting said material to a high degree of vacuum and to atmospheric oxygen to remove said gases from the cell structure of the material.

5. The method of sterilizing various materials which consists in placing said materials in a treating chamber, evacuating said chamber to a vacuum of not less than 29½ mercury inches, admitting a volume of carbon dioxide gas to said chamber insufficient to materially reduce said vacuum, then admitting a volume of highly concentrated dry lethal gas to said chamber insufficient to materially reduce said vacuum, closing off said chamber to maintain said vacuum therein for a predetermined length of time, and then alternately subjecting said material to a high degree of vacuum and atmospheric oxygen to remove the gases therefrom.

ALEXANDRA MOON.